Patented May 31, 1949

2,471,767

UNITED STATES PATENT OFFICE 2,471,767

PREPARATION OF FUMARONITRILE

David T. Mowry and William H. Yanko, Dayton, Ohio, assignors to Monsanto Chemical Company, St. Louis, Mo., a corporation of Delaware No Drawing. Application November 15, 1947, Serial No. 786,332

2 Claims. (Cl. 260—465.8)

This invention relates to the preparation of fumaronitrile by a new and improved method.

Heretofore fumaronitrile has been prepared from maleic anhydride by conversion first to maleic esters, then by isomerization to the fumaric esters, then by conversion to the amide, and finally by dehydration to form the fumaronitrile. Such procedure involves too many separate reactions and is therefore prohibitively costly. The fundamental purpose of the present invention is to provide a new and improved method of preparing fumaronitrile from the inexpensive and readily available acrylonitrile.

It is well known that acrylonitrile, which has recently become a low cost industrial chemical, may be readily converted to chloro-acrylonitrile by a variety of processes, or the chloro-acrylonitrile may be synthesized directly from acetylene. In accordance with this invention the chloro-acrylonitriles are reacted with a water soluble metal cyanide, for example sodium cyanide, potassium cyanide, or calcium cyanide, in a weakly alkaline solution and thereby converted into fumaronitrile.

The conversion of alpha-chloro-acrylonitrile into fumaronitrile is preferably practiced in an alkaline solution in the presence of buffer salts which enable the maintenance of the solution within a preferred pH range of about 7 to 9. It has been found that acetic acid solutions or solutions of mono sodium phosphate are very effective mediums for the practice of this new method. Lower yields occur under more strongly acid conditions, for example when hydrogen cyanide is treated with chloro-acrylonitrile. Under more basic conditions, the yields are reduced by degradation of the fumaronitrile whereby dark resinous decomposition products are formed.

Further details of the invention are set forth in the following examples.

Example 1

A solution of 52 parts sodium cyanide in 200 parts of water was treated with sufficient acetic acid (about 60 parts) to raise the pH to 8. Then 50 parts of chloro-acrylonitrile (prepared by the demuriation of alpha, beta-dichloropropionitrile) was slowly added, keeping the temperature at 25-30° C. by stirring and cooling. After three hours, the mixture was diluted with 150 parts of water and the solution distilled at about 200 mm. pressure. A substantial yield of solid was obtained by cooling the aqueous distillate. This melted at 96-97° C. and was identified as fumaronitrile by a mixed melting point with an authentic sample.

Example 2

The procedure of Example 1 was repeated except that the weakly alkaline solution was maintained with sodium dihydrogen phosphate. Equally good yields of fumaronitrile were obtained.

Although this invention has been described with respect to specific examples it is not intended that the details thereof shall be construed as limitations upon the scope except to the extent incorporated in the following claims.

We claim:

1. A method of preparing fumaronitrile which comprises reacting α-chloroacrylonitrile in an aqueous solution of pH value of 7 to 9 with a water soluble cyanide of the group consisting of alkali metal cyanides and alkaline earth metal cyanides.

2. A method of preparing fumaronitrile which comprises reacting α-chloroacrylonitrile with a water soluble cyanide of the group consisting of alkali metal cyanides and alkaline earth metal cyanides in a solution maintained weakly alkaline by the presence of a buffer salt.

DAVID T. MOWRY.
WILLIAM H. YANKO.

REFERENCES CITED

The following references are of record in the file of this patent:

UNITED STATES PATENTS

| Number | Name | Date |
| --- | --- | --- |
| 2,342,101 | Cass et al. | Feb. 22, 1944 |
| 2,399,349 | Hochwalt | Apr. 30, 1946 |
| 2,415,261 | Rogers | Feb. 4, 1947 |